(12) United States Patent
Fujisawa (10) Patent No.: US 9,354,830 B2
(45) Date of Patent: May 31, 2016

(54) INFORMATION PROCESSING APPARATUS, INFORMATION PROCESSING APPARATUS CONTROL METHOD, AND STORAGE MEDIUM

(71) Applicant: CANON KABUSHIKI KAISHA, Tokyo (JP)

(72) Inventor: Minoru Fujisawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/092,144

(22) Filed: Nov. 27, 2013

(65) Prior Publication Data

US 2014/0146345 A1    May 29, 2014

(30) Foreign Application Priority Data

Nov. 29, 2012 (JP) ................................ 2012-260532

(51) Int. Cl.
*G06F 3/12* (2006.01)
*G06K 15/00* (2006.01)
*H04L 29/08* (2006.01)

(52) U.S. Cl.
CPC ............ *G06F 3/1229* (2013.01); *G06F 3/1221* (2013.01); *G06F 3/1285* (2013.01); *G06K 15/4055* (2013.01); *H04L 67/14* (2013.01); *Y02B 60/1271* (2013.01)

(58) Field of Classification Search
CPC ... G06F 3/1221; G06F 3/1229; G06F 1/3284; G06F 3/1285; H04N 1/00896; G06K 15/4055; H04L 67/14
See application file for complete search history.

(56) References Cited

U.S. PATENT DOCUMENTS

| | | | | |
|---|---|---|---|---|
| 2006/0236143 A1* | 10/2006 | Kidoguchi | .................... | 713/320 |
| 2007/0146775 A1* | 6/2007 | Maeda | ......................... | 358/1.15 |
| 2007/0240004 A1* | 10/2007 | Maeda | ......................... | 713/322 |
| 2010/0174940 A1* | 7/2010 | Kitora | ............................... | 714/7 |
| 2011/0191614 A1* | 8/2011 | Tsuzuki | .................... | G06F 1/32 713/320 |
| 2011/0194133 A1* | 8/2011 | Fujisawa | ............... | G06F 3/1221 358/1.13 |
| 2011/0194148 A1* | 8/2011 | Kobayashi | ................... | 358/1.16 |
| 2012/0002236 A1* | 1/2012 | Ebisui | ......................... | 358/1.15 |
| 2012/0019848 A1* | 1/2012 | Uemura | ........................ | 358/1.9 |
| 2012/0194580 A1* | 8/2012 | Sasaki | ............................... | 347/5 |
| 2012/0272050 A1* | 10/2012 | Seo et al. | ........................ | 713/2 |
| 2013/0163056 A1* | 6/2013 | Hanayama | .................... | 358/474 |

FOREIGN PATENT DOCUMENTS

JP        2006-259906 A        9/2006

* cited by examiner

*Primary Examiner* — Marivelisse Santiago Cordero
*Assistant Examiner* — Daryl Jackson
(74) *Attorney, Agent, or Firm* — Canon USA, Inc. IP Division

(57) ABSTRACT

If an information processing apparatus detects that a shift condition for shifting from a normal power mode to a power saving mode has been satisfied, the information processing apparatus determines whether a session with an external apparatus has been established. If it is determined that the session has been established, the information processing apparatus shifts to a first power saving mode while maintaining the session. On the other hand, if it is determined that the session has not been established, the information processing apparatus shifts to a second power saving mode in which less power is consumed than in the first power saving mode.

14 Claims, 7 Drawing Sheets

FIG.1

100 INFORMATION PROCESSING SYSTEM

INFORMATION PROCESSING APPARATUS, INFORMATION PROCESSING APPARATUS CONTROL METHOD, AND STORAGE MEDIUM

BACKGROUND

1. Field

Aspects of the present invention generally relate to an information processing apparatus, an information processing apparatus control method, and a storage medium.

2. Description of the Related Art

There is an increasing need to reduce the power consumption of an information processing apparatus, such as a printer or a digital multifunction peripheral. In response to this need, a technology is known for shifting the information processing apparatus from a normal power mode to a power saving mode when the information processing apparatus has not operated for a predetermined time, for example. In the normal power mode, power is supplied to both a main control unit and a communication unit of the information processing apparatus. On the other hand, in the power saving mode, although power continues to be supplied to the communication unit of the information processing apparatus, the power supply to the main control unit of the information processing apparatus is reduced or cut off. Therefore, the power saving mode reduces the power consumption of the overall information processing apparatus compared with the normal power mode. Japanese Patent Application Laid-Open No. 2006-259906 discusses an information processing apparatus in which the main control unit responds to a packet received from an external apparatus when the information processing apparatus is in a normal power mode, and the communication unit responds to a received packet instead of the main control unit when the information processing apparatus is in a power saving mode.

Further, an information processing apparatus such as a printer or a digital multifunction peripheral can perform communication using Internet protocol security (IPSec) or transmission control protocol (TCP) communication. To perform such communication, a session has to be established between the information processing apparatus and an external apparatus.

For communication that requires a session to be established, such as IPSec and TCP, the information processing apparatus and the external apparatus both need to manage the session with each other, and periodically send and receive a session confirmation packet for confirmation of the session (keep-alive communication). A keep-alive communication allows the external apparatus to check that a link between the information processing apparatus and the external apparatus is operating, or to prevent the link from being broken. Since the communication unit discussed in Japanese Patent Application Laid-Open No. 2006-259906 does not perform session management and does not support keep-alive communication, even if the information processing apparatus shifts to the power saving mode, the information processing apparatus immediately shifts back to the normal power mode when a session confirmation packet is received, for example. Namely, in Japanese Patent Application Laid-Open No. 2006-259906, the power saving mode cannot be maintained in an environment which performs communication that requires a session to be established, so that the benefits of the power saving mode that reduces power consumption cannot be sufficiently obtained.

Further, if the communication unit is provided with a configuration to support session management and keep-alive communication, various pieces of hardware (e.g., an IPSec encoding/decoding unit) have to be provided in the communication unit. This results in the costs of the communication unit increasing, which leads to an increase in the costs of the overall information processing apparatus. Consequently, it is not desirable to provide a configuration to support session management and keep-alive communication in the communication unit.

SUMMARY

An aspect of the present invention is generally directed to an information processing apparatus capable of operating in a power saving mode while maintaining a session established between the information processing apparatus and an external apparatus.

According to an aspect of the present invention, an information processing apparatus capable of communicating with an external apparatus includes a detection unit configured to detect that a shift condition for shifting the information processing apparatus from a normal power mode to a power saving mode has been satisfied, a determination unit configured to, if the detection unit detects that the shift condition has been satisfied, determine whether a session for performing specific communication between the information processing apparatus and the external apparatus has been established, and a power supply control unit configured to, if the determination unit determines that the session has been established, shift the information processing apparatus to a first power saving mode in which less power is consumed than in the normal power mode while supplying power to a first control unit that performs processing for maintaining the session, and if the determination unit determines that the session has not been established, stop supplying power to the first control unit and shift the information processing apparatus to a second power saving mode in which less power is consumed than in the first power saving mode.

Further features of the present disclosure will become apparent from the following description of exemplary embodiments with reference to the attached drawings.

DESCRIPTION OF THE EMBODIMENTS

Various exemplary embodiments, features, and aspects will be described in detail below with reference to the drawings.

Figure 1:
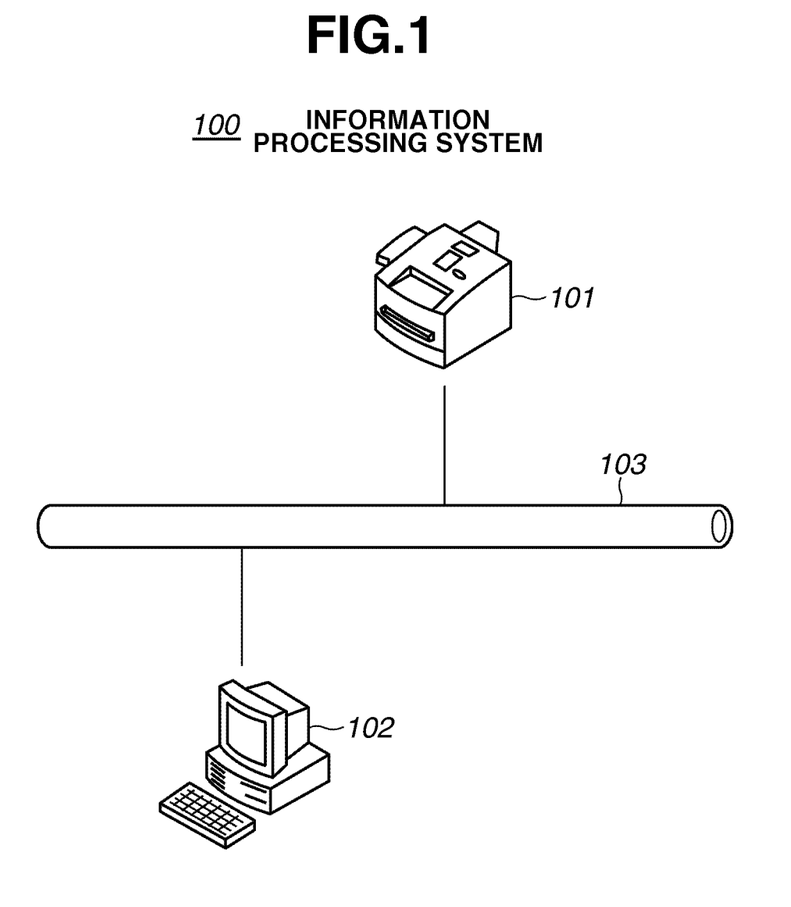
FIG. 1 illustrates an information processing system.

A configuration of an information processing system 100 according to a first exemplary embodiment will be described with reference to FIG. 1. The information processing system 100 includes an information processing apparatus 101 and a personal computer (PC) 102. The information processing apparatus 101 and the PC 102 are connected to each other via a network 103.

Figure 2:
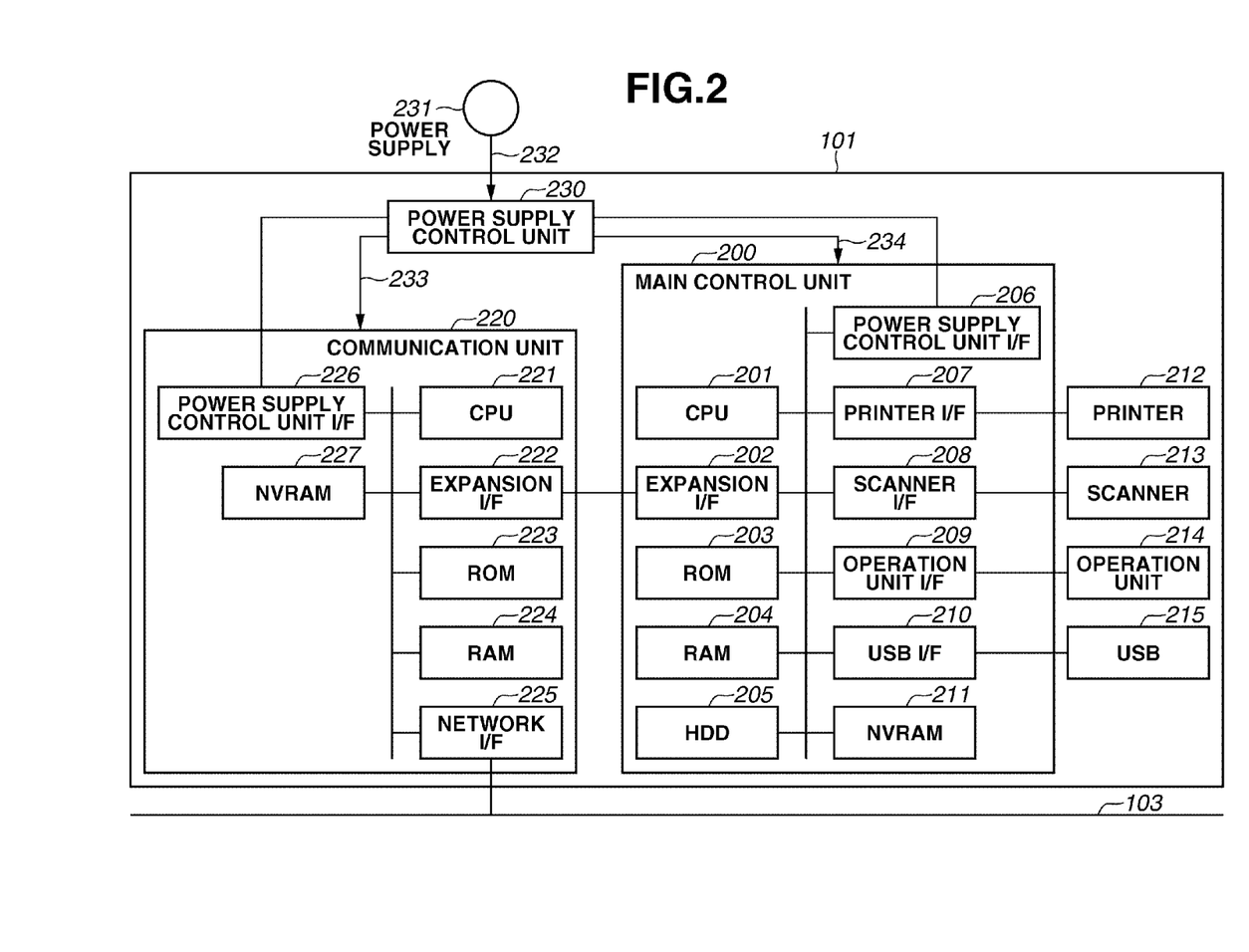
FIG. 2 illustrates a configuration of an information processing apparatus.

Next, a hardware configuration of the information processing apparatus 101 will be described with reference to FIG. 2. The information processing apparatus 101 is a digital multifunction peripheral (printing apparatus) that includes a copy function, a print function, a scan function, a send function and the like. Although the present exemplary embodiment is described using a digital multifunction peripheral as an example, the information processing apparatus 101 is not limited to a digital multifunction peripheral. The information processing apparatus 101 does not have to include all of the above-mentioned functions. It is acceptable if the information processing apparatus 101 includes at least one of those functions. The information processing apparatus 101 may also further include other functions.

The information processing apparatus 101 includes a main control unit 200, a communication unit 220, a power supply control unit 230, a printer 212, a scanner 213, an operation unit 214, and a universal serial bus (USB) 215. The configuration of each unit will be described below.

The main control unit 200 includes a central processing unit (CPU) 201, an expansion I/F 202, a read-only memory (ROM) 203, a random-access memory (RAM) 204, a hard disk drive (HDD) 205, a power supply control unit I/F 206, a printer I/F 207, a scanner I/F 208, an operation unit I/F 209, a USB I/F 210, and a non-volatile RAM (NVRAM) 211. These units are communicably connected to each other via a bus.

The CPU 201 controls the overall information processing apparatus 101 by reading a control program stored in the ROM 203. The RAM 204 is used as a main memory of the CPU 201 and as a temporary storage area, such as a work area. The HDD 205 is used as a storage area for storing various information, such as font data, emulation programs, and form data. The NVRAM 211 is a non-volatile memory that stores various information. The expansion I/F 202 performs communication with the communication unit 220.

In the case of the main control unit 200 of the information processing apparatus 101, the CPU 201 solely executes the various processes illustrated in the below-described flowcharts by using a single memory (the RAM 204 or the HDD 205). However, some other mode may also be employed. For example, the various processes illustrated in the below-described flowcharts may be executed by a plurality of CPUs and a plurality of RAMs or HDDs working in cooperation.

The printer I/F 207 connects the main control unit 200 and the printer 212. The printer 212 executes print processing based on a print job or image data generated by the scanner 213. The image data to be printed by the printer 212 is transferred to the printer 212 from the main control unit 200 via the printer I/F 207.

The scanner I/F 208 connects the main control unit 200 and the scanner 213. The scanner 213 generates image data by reading a document. The image data generated by the scanner 213 is transferred to the main control unit 200 via the scanner I/F 208.

The operation unit I/F 209 connects the main control unit 200 and the operation unit 214. The operation unit 214 includes a liquid crystal display unit having a touch panel function, a keyboard and the like. Information input by the user using the operation unit 214 is transferred to the main control unit 200 via the operation unit I/F 209.

The USB I/F 210 connects the main control unit 200 and the USB 215. The USB 215 can recognize a non-volatile USB memory that is externally inserted, and control the file system in the USB memory in cooperation with the USB I/F 210.

The power supply control unit I/F 206 connects the main control unit 200 and the power supply control unit 230. A below-described power mode shift instruction is transferred from the main control unit 200 to the power supply control unit 230 via the power supply control unit I/F 206.

Next, the communication unit 220 will be described. The communication unit 220 includes a CPU 221, an expansion I/F 222, a ROM 223, a RAM 224, a network I/F 225, a power supply control unit I/F 226, and an NVRAM 227. These units are communicably connected to each other via a bus The CPU 221 controls operation of the communication unit 220 by reading a control program stored in the ROM 223. The RAM 224 is used as a main memory of the CPU 221 and as a temporary storage area, such as a work area. The NVRAM 227 is a non-volatile memory that stores various information.

In the case of the communication unit 220 of the information processing apparatus 101, the CPU 221 solely executes the various processes illustrated in the below-described flowcharts by using a single memory (the RAM 224). However, some other mode may also be employed. For example, the various processes illustrated in the below-described flowcharts may be executed by a plurality of CPUs and a plurality of RAMs working in cooperation.

The network I/F 225 is connected to the network 103, and performs transmission and reception of data to/from an external apparatus such as the PC 102. The expansion I/F 222 performs communication with the main control unit 200.

The power supply control unit I/F 226 connects the communication unit 220 and the power supply control unit 230. A below-described power mode shift instruction is transferred from the communication unit 220 to the power supply control unit 230 via the power supply control unit I/F 226.

The power supply control unit 230 converts an alternating current supplied from the a power supply 231 via a power supply line 232 into a direct current, and supplies the direct current to the communication unit 220 and the main control unit 200 via power supply lines 233 and 234, respectively. In the present embodiment, the power supply control unit 230 also supplies a direct current separately to the printer 212, the scanner 213, the operation unit 214, and the USB 215 via a power supply line (not illustrated). The power supply control unit 230 controls the power mode of the information processing apparatus 101 based on a shift instruction received from the power supply control unit I/F 206 or the power supply control unit I/F 226.

Next, the power modes that the information processing apparatus 101 has will be described. The information processing apparatus 101 has three power modes, a normal power mode, a first power saving mode, and a second power saving mode.

When the information processing apparatus 101 operates in the normal power mode, power is supplied by the power supply control unit 230 to all of the units (the main control unit 200, the communication unit 220, the printer 212, the scanner 213, the operation unit 214, and the USB 215) in the information processing apparatus 101. In the normal power mode, printing processing by the printer 212, and IPSec and TCP communication by the main control unit 200 via the communication unit 220, can be executed.

Figure 3:
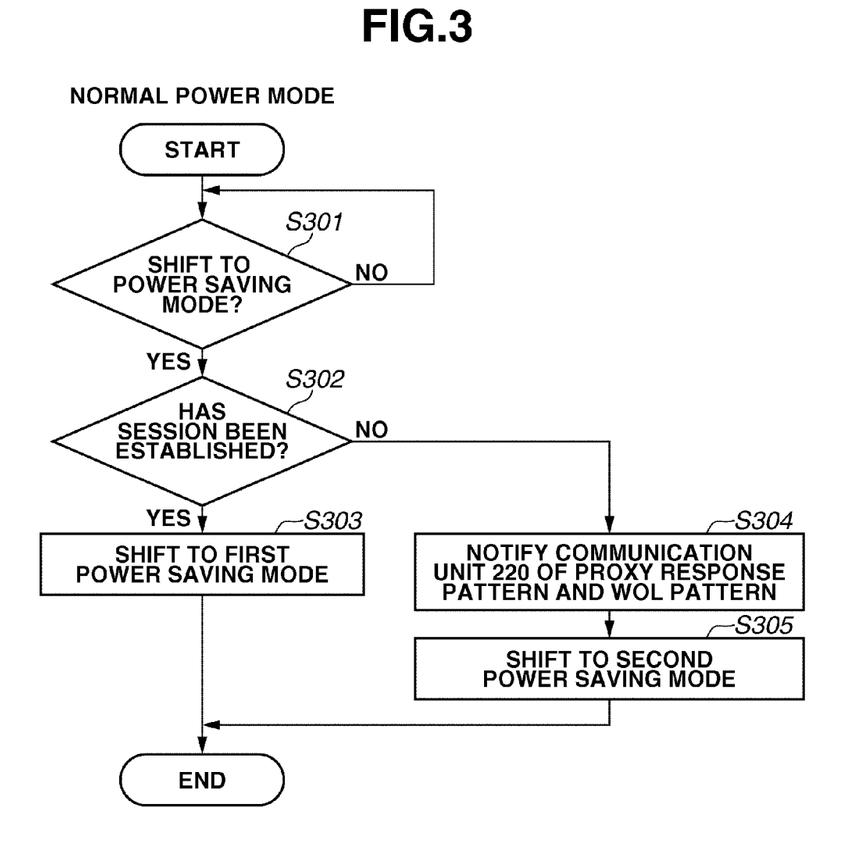
FIG. 3 is a flowchart illustrating the processing that is performed when an information processing apparatus shifts from a normal power mode to a power saving mode.

When the information processing apparatus 101 detects that a condition for shifting to a power saving mode has been satisfied, the information processing apparatus 101 shifts to the first power saving mode or the second power saving mode. The shift to a power saving mode will be described with reference to the flowchart of FIG. 3. The CPU 201 in the main control unit 200 executes the respective steps illustrated in the flowchart of FIG. 3 by opening and executing a program stored in a memory, such as the ROM 203, in the RAM 204. The processing illustrated in the flowchart of FIG. 3 is executed when the information processing apparatus 101 is operating in the normal power mode.

In step S301, the CPU 201 determines whether to shift from the normal power mode to a power saving mode. In the present exemplary embodiment, if the CPU 201 detects that a condition for shifting to a power saving mode has been satisfied, the CPU 201 determines in step S301 to shift from the normal power mode to the power saving mode (YES in step S301), and the processing proceeds to step S302. On the other hand, if the CPU 201 does not detect that the condition for shifting to a power saving mode has been satisfied, the CPU 201 determines in step S301 not to shift from the normal power mode to a power saving mode (NO in step S301), and waits until the condition for shifting to a power saving mode has been satisfied. Further, in the present exemplary embodiment, the CPU 201 determines that the condition for shifting to a power saving mode has been satisfied when, for example, a print job has not been input into the information processing apparatus 101 for a predetermined period (e.g. 5 minutes), or when an instruction to shift to a power saving mode has been input from the user via the operation unit 214.

Next, in step S302, the CPU 201 determines whether a session has been established between the information processing apparatus 101 and the PC 102. In the present exemplary embodiment, a session is established between the information processing apparatus 101 and the PC 102 when the PC 102 performs a specific type of communication (e.g., IPSec, TCP communication) with the information processing apparatus 101.

If the CPU 201 determines in step S302 that a session has been established between the information processing apparatus 101 and the PC 102 (YES in step S302), the processing proceeds to step S303. In step S303, the CPU 201 transmits a shift instruction for shifting to the first power saving mode to the power supply control unit 230 via the power supply control unit I/F 206. Then, the information processing apparatus 101 is shifted by the power supply control unit 230 from the normal power mode to the first power saving mode. In the first power saving mode, although power is supplied by the power supply control unit 230 to the communication unit 220, the supply of power to the printer 212, the scanner 213, the operation unit 214, and the USB 215 is shut off. Further, the supply of power to the main control unit 200 is reduced compared with the normal power mode. Specifically, although power is supplied to the CPU 201, the expansion I/F 202, the ROM 203, and the RAM 204, the supply of power to the other units in the main control unit 200 is shut off. Therefore, the first power saving mode is a power mode in which the information processing apparatus 101 consumes less power than in the normal power mode. When the information processing apparatus 101 operates in the first power saving mode, the session established between the information processing apparatus 101 and the PC 102 is maintained by the main control unit 200.

On the other hand, if the CPU 201 determines in step S302 that a session has not been established between the information processing apparatus 101 and the PC 102 (NO in step S302), the processing proceeds to step S304. Then, in step S104, the CPU 201 notifies the communication unit 220 of a proxy response pattern and a wake on local area network (WOL) pattern stored in the ROM 203 via the expansion I/F 202. The proxy response pattern and the WOL pattern will be described in more detail below. The proxy response pattern and the WOL pattern provided to the communication unit 220 in step S304 are stored in the NVRAM 227 of the communication unit 220.

Next, in step S305, the CPU 201 transmits a shift instruction for shifting to the second power saving mode to the power supply control unit 230 via the power supply control unit I/F 206. Then, the information processing apparatus 101 is shifted by the power supply control unit 230 from the normal power mode to the second power saving mode. In the second power saving mode, although power is supplied by the power supply control unit 230 to the communication unit 220, the supply of power to the printer 212, the scanner 213, the operation unit 214, and the USB 215 is shut off. Further, since the supply of power to the main control unit 200 is also shut off, the second power saving mode is a power mode in which the information processing apparatus 101 consumes even less power than in the first power saving mode.

If the information processing apparatus 101 operates in the second power saving mode, when the communication unit 220 receives a packet transmitted from an external apparatus such as the PC 102, the communication unit 220 analyzes the received packet, and determines the processing to be performed on the received packet. At this stage, the communication unit 220 determines the processing to be performed on the received packet by referring to the proxy response pattern and the WOL pattern (reference information) provided by the main control unit 200. If the received packet matches the proxy response pattern, instead of the main control unit 200, the communication unit 220 responds to the received packet while maintaining the second power saving mode (hereinafter, this function is referred to as a proxy response). As the proxy response pattern, for example, a pattern indicating an address resolution protocol (ARP) request or a simple network management protocol (SNMP) device information acquisition request, which is addressed to the own device, is stored in the NVRAM 227.

If the received packet matches the WOL pattern, the communication unit 220 transmits a shift instruction for shifting to the normal power mode to the power supply control unit 230 via the power supply control unit I/F 226. Then, the information processing apparatus 101 is shifted by the power supply control unit 230 from the second power saving mode to the normal power mode. When the information processing apparatus 101 shifts from the second power saving mode to the normal power mode, the packet received via the network I/F 225 is transferred to the main control unit 200 via the expansion I/F 222, and the main control unit 200 performs processing on the transferred packet. As the WOL pattern, for example, a pattern indicating a magic packet or a print job, which is addressed to the own device, is stored in the NVRAM 227.

Figure 4:
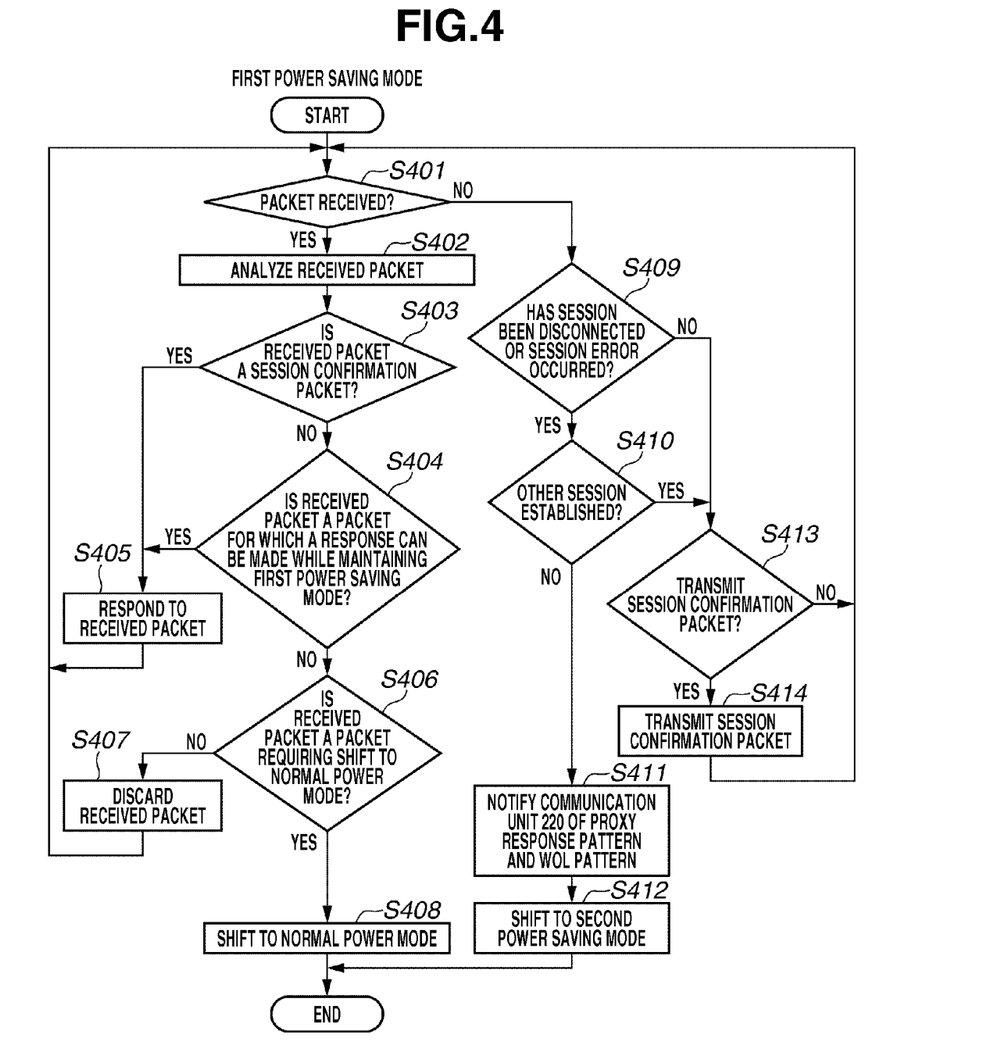
FIG. 4 is a flowchart illustrating the processing that is performed when an information processing apparatus is in a first power saving mode.

Next, the processing performed when the information processing apparatus 101 operates in the first power saving mode will be described with reference to the flowchart of FIG. 4. The CPU 201 in the main control unit 200 executes the respective steps illustrated in the flowchart of FIG. 4 by opening and executing a program stored in a memory, such as the ROM 203, in the RAM 204.

In step S401, the CPU 201 determines whether the communication unit 220 has received a packet transmitted from an external apparatus such as the PC 102. If the CPU 201 determines in step S401 that a packet has been received (YES in step S401), the processing proceeds to step S402. In step S402, the CPU 201 analyzes the received packet. On the other hand, the CPU 201 determines in step S401 that a packet has not been received (NO in step S401), the processing proceeds to step S409.

When the CPU 201 has analyzed the received packet in step S402, the processing proceeds to step S403. In step S403, the CPU 201 determines whether the received packet is a session confirmation packet. If the information processing apparatus 101 operates in the first power saving mode, since a session is established with an external apparatus, a session confirmation packet transmitted from the external apparatus may be received.

If the CPU 201 determines in step S403 that the received packet is a session confirmation packet (YES in step S403), the processing proceeds to step S405. In step S405, the CPU 201 transmits a response packet for the session confirmation packet via the communication unit 220. On the other hand, if the CPU 201 determines in step S403 that the received packet is not a session confirmation packet (NO in step S403), the processing proceeds to step S404.

In step S404, the CPU 201 determines whether the received packet is a packet for which a response can be made while maintaining the first power saving mode. In the present exemplary embodiment, for example, if the received packet is a packet indicating an ARP request or a SNMP device information acquisition request, which is addressed to the own device, the CPU 201 determines that the received packet is a packet for which a response can be made while maintaining the first power saving mode (YES in step S404), and the processing proceeds to step S405. In step S405, the CPU 201 transmits a response packet for the received packet via the communication unit 220. On the other hand, if the CPU 201 determines in step S404 that the received packet is a not packet for which a response can be made while maintaining the first power saving mode (NO in step S404), the processing proceeds to step S406.

In step S406, the CPU 201 determines whether the received packet requires a shift to the normal power mode in order to process the received packet. In the present exemplary embodiment, for example, if the received packet indicates a print job, the CPU 201 determines that the packet requires a shift to the normal power mode (YES in step S406), and the processing proceeds to step S408. On the other hand, if the CPU 201 determines in step S406 that the packet does not require a shift to the normal power mode (NO in step S406), the processing proceeds to step S407. In step S407, the CPU 201 discards the received packet.

In step S408, the CPU 201 controls the information processing apparatus 101 to shift from the first power saving mode to the normal power mode. Specifically, the CPU 201 transmits a shift instruction for shifting from the first power saving mode to the normal power mode to the power supply control unit 230 via the power supply control unit I/F 206, and the information processing apparatus 101 is shifted by the power supply control unit 230 from the first power saving mode to the normal power mode. Then, the processing to be performed on the received packet (e.g., print processing based on a print job) is performed by the information processing apparatus 101 that has shifted to the normal power mode.

Next, step S409 will be described. In step S409, the CPU 201 determines whether the session established with the external apparatus has been disconnected or whether a session error has occurred. If the CPU 201 determines that the session has been disconnected or a session error has occurred (YES in step S409), the processing proceeds to step S410. On the other hand, if the CPU 201 determines that neither a disconnection of the session nor a session error has occurred (NO in step S409), the processing proceeds to step S413.

In step S410, the CPU 201 determines whether a session other than the session that has been disconnected or in which an error has occurred is established with an external apparatus. If the CPU 201 determines that another session has been established (YES in step S410), the processing proceeds to step S413. On the other hand, if the CPU 201 determines that another session has not been established (NO in step S410), the processing proceeds to step S411.

If all of the sessions established with an external apparatus have been disconnected or have resulted in an error, the need for the information processing apparatus 101 to maintain the first power saving mode is eliminated. Therefore, in the present exemplary embodiment, when all of the sessions established with an external apparatus have been disconnected or have resulted in an error, the information processing apparatus 101 shifts from the first power saving mode to the second power saving mode.

First, in step S411, the CPU 201 notifies the communication unit 220 of the proxy response pattern and the WOL pattern stored in the ROM 203 via the expansion I/F 202. The proxy response pattern and the WOL pattern provided to the communication unit 220 in step S411 are stored in the NVRAM 227 of the communication unit 220.

Then, in step S412, the CPU 201 controls the information processing apparatus 101 to shift from the first power saving mode to the second power saving mode. Specifically, the CPU 201 transmits a shift instruction for shifting from the first power saving mode to the second power saving mode to the power supply control unit 230 via the power supply control unit I/F 226. The information processing apparatus 101 is then shifted by the power supply control unit 230 from the first power saving mode to the second power saving mode.

Next, step S413 will be described. When the information processing apparatus 101 operates in the first power saving mode, the information processing apparatus 101 needs to periodically transmit a session confirmation packet to an external apparatus at a predetermined time interval to maintain the session that is established with the external apparatus. This time interval is set in advance in the information processing apparatus 101 by the user, or is determined and stored in the NVRAM 211 when a session is established with an external apparatus. In step S413, the CPU 201 determines whether to transmit a session confirmation packet. In step S413, when the timing to transmit the session confirmation packet indicated by the time interval stored in the NVRAM 211 is reached, the CPU 201 determines that a session confirmation packet is to be transmitted (YES in step S413), and the processing proceeds to step S414. Then, in step S414, the CPU 201 transmits a session confirmation packet via the communication unit 220 to the external apparatus, such as the PC 102.

Thus, in the first power saving mode, the main control unit 200 can operate in a state that consumes less power than the normal power mode, while maintaining a session that is established with an external apparatus.

Figure 5:
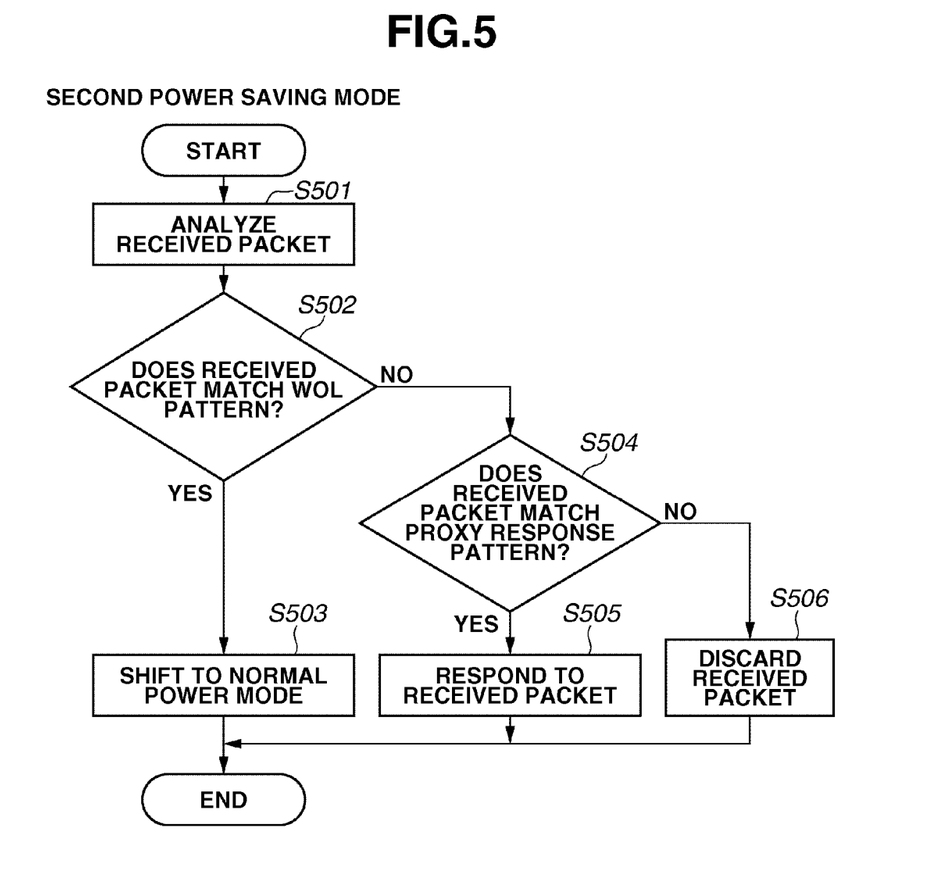
FIG. 5 is a flowchart illustrating the processing that is performed when an information processing apparatus is in a second power saving mode.

Next, the processing performed when the information processing apparatus 101 operates in the second power saving mode will be described with reference to the flowchart of FIG. 5. The processing illustrated by the flowchart of FIG. 5 is processing that is performed when a packet transmitted from an external apparatus is received by the communication unit 220. Further, the CPU 221 in the communication unit 220 executes the respective steps illustrated in the flowchart of FIG. 5 by opening and executing a program stored in a memory, such as the ROM 223, in the RAM 224.

When the communication unit 220 receives a packet transmitted from an external apparatus, such as the PC 102, in step S501, the CPU 221 analyzes the received packet. Then, in step S502, the CPU 221 determines whether the received packet matches the WOL pattern.

If the CPU 221 determines that the received packet matches the WOL pattern (YES in step S502), the processing proceeds to step S503. In step S503, the CPU 221 controls the information processing apparatus 101 to shift to the normal power mode. Specifically, the CPU 221 transmits a shift instruction for shifting to the normal power mode to the power supply control unit 230 via the power supply control unit I/F 226, and the information processing apparatus 101 is shifted by the power supply control unit 230 from the second power saving mode to the normal power mode. When the information processing apparatus 101 has shifted to the normal power mode, the packet received via network I/F 225 is transferred to the main control unit 200 via the expansion I/F 222, and the processing to be performed on the received packet (e.g., print processing based on a print job) is performed by the main control unit 200.

If the CPU 221 determines in step S503 that the received packet does not match the WOL pattern (NO in step S503), the processing proceeds to step S504. In step S504, the CPU 221 determines whether the received packet matches the proxy response pattern.

If the CPU 221 determines in step S504 that the received packet matches the proxy response pattern (YES in step S504), the processing proceeds to step S505. In step S505, the CPU 221 responds to the received packet while maintaining the second power saving mode (the CPU 221 transmits a proxy response). On the other hand, if the CPU 221 determines in step S504 that the packet does not match the proxy response pattern (NO in step S504), the processing proceeds to step S506. In step S506, the CPU 221 discards the received packet.

Thus, according to the present embodiment, when the information processing apparatus 101 shifts from the normal power mode to the power saving mode, the CPU 201 determines whether a session is established between the information processing apparatus 101 and an external apparatus (PC 102). If it is determined that a session is established, the information processing apparatus 101 shifts to the first power saving mode. In the first power saving mode, the main control unit 200 can operate in a state that consumes less power than the normal power mode while the main control unit 200 maintains the session.

On the other hand, if it is determined a session is not established, the information processing apparatus 101 shifts to the second power saving mode. In the second power saving mode, the power consumption of the information processing apparatus 101 can be reduced even more than in the first power saving mode.

In the present exemplary embodiment, although a notification of the proxy response pattern and the WOL pattern is provided to the communication unit 220 when shifting to the second power saving mode, this notification can be provided at some other timing. For example, a notification of the proxy response pattern and the WOL pattern may be provided to the communication unit 220 when the information processing apparatus 101 is started.

Next, a second exemplary embodiment will be described. The present exemplary embodiment is directed to reducing the power consumption of the information processing apparatus 101 when operating in the first power saving mode even more than in the first exemplary embodiment.

Figure 6:
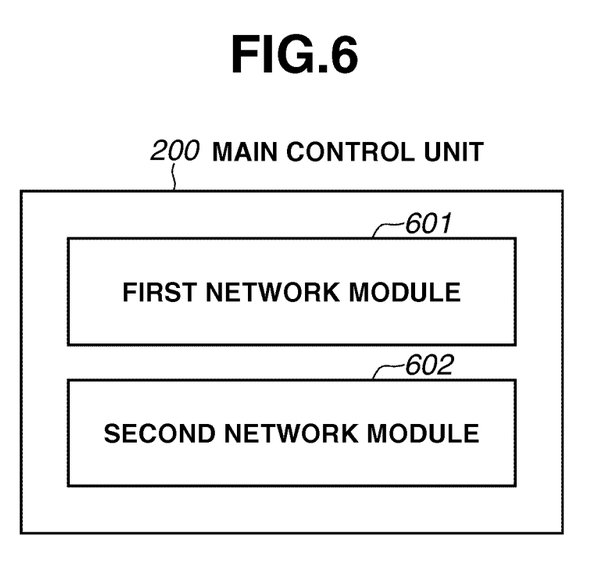
FIG. 6 illustrates a software configuration of an information processing apparatus.

First, the software configuration of the information processing apparatus 101 according to the present embodiment will be described. FIG. 6 illustrates a part of the software that is executed by the CPU 201 in the main control unit 200.

A first network module 601, which is software that is executed when the information processing apparatus 101 operates in the normal power mode, is a module compatible with every type of communication (e.g., SNMP, IPSec, hypertext transfer protocol (HTTP)) supported by the information processing apparatus 101. The first network module 601 includes the information that is needed for analysis of received packets and for generation of transmission packets and response packets for every type of communication supported by the information processing apparatus 101. When the information processing apparatus 101 operates in the normal power mode, the information processing apparatus 101 starts the first network module 601 regardless of the type of communication to be performed with an external apparatus.

A second network module 602 is software that is executed when the information processing apparatus 101 operates in a power saving mode. Unlike the first network module 601, the second network module 602 is a module that is compatible with only a specific type of communication using the session established between the information processing apparatus 101 and an external apparatus. When the second network module 602 is started, the information needed for that specific type of communication is copied from the first network module 601. Consequently, the second network module 602 operates as a module that is compatible with only the specific type of communication using the session established between the information processing apparatus 101 and the external apparatus.

A comparison of when the CPU 201 starts the first network module 601 and when the CPU 201 starts the second network module 602 shows that the load on the CPU 201 is less when the second network module 602 is started than when the first network module 601 is started. Accordingly, in the present exemplary embodiment, when the information processing apparatus 101 operates in the normal power mode, the first network module 601 is started, and when the information processing apparatus 101 operates in the first power saving mode, the second network module 602 is started instead of the first network module 601.

Figure 7:
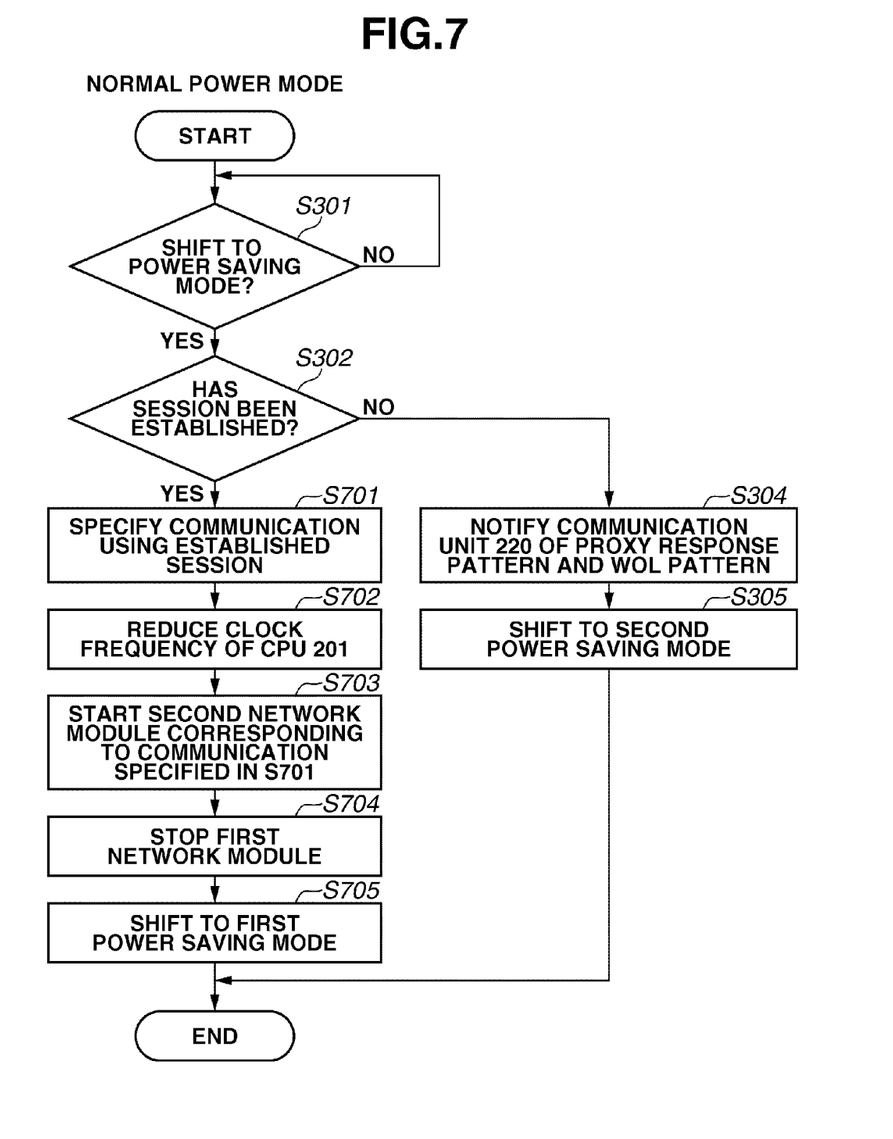
FIG. 7 is a flowchart illustrating the processing executed when an information processing apparatus shifts from a normal power mode to a power saving mode.

The flowchart in FIG. 7 illustrates the processing that is performed when the information processing apparatus 101 shifts from the normal power mode to a power saving mode. The CPU 201 in the main control unit 200 executes the respective steps illustrated in the flowchart of FIG. 7 by opening and executing a program stored in a memory, such as the ROM 203, in the RAM 204. Among the steps of FIG. 7, since the steps denoted with the same number as in FIG. 3 are performing the same processing as in FIG. 3, a description thereof will be omitted here.

If the CPU 201 determines in step S302 that a session has been established (YES in step S302), the processing proceeds to step S701. In step S701, the CPU 201 specifies the communication using the session established with an external apparatus such as the PC 102. For example, if the communication using the session established with the external apparatus is IPSec, in step S701 IPSec is specified.

Next, in step S702, the CPU 201 controls the clock frequency of the CPU 201 so that the frequency is less than when operating in the normal power mode. For example, the CPU 201 controls the clock frequency so that the 1.8 GHz clock frequency when the information processing apparatus 101 operates in the normal power mode decreases to 125 MHz when the information processing apparatus 101 operates in the first power saving mode. When the information processing apparatus 101 operates in the first power saving mode, since the load on the CPU 201 is reduced due to starting the second network module 602 rather than the first network module 601, the clock frequency of the CPU 201 can be decreased.

Next, in step S703, the CPU 201 starts the second network module 602 that is compatible with the communication specified in step S701. For example, if the communication specified in step S701 is IPSec, the information needed for IPSec is copied from the first network module 601 to the second network module 602, and that second network module 602 is started.

Then, in step S704, the CPU 201 stops the first network module 601.

Next, in step S705, the CPU 201 controls the information processing apparatus 101 to shift from the normal power mode to the first power saving mode. Specifically, the CPU 201 transmits a shift instruction for shifting to the first power saving mode to the power supply control unit 230 via the power supply control unit I/F 206, and the information processing apparatus 101 is shifted by the power supply control unit 230 from the normal power mode to the first power saving mode.

Thus, according to the present exemplary embodiment, when the information processing apparatus 101 operates in the first power saving mode, the clock frequency of the CPU 201 can be reduced compared with the normal power mode. Consequently, power consumption can be reduced even more compared with the first power saving mode according to the first exemplary embodiment.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-260532 filed Nov. 29, 2012, which is hereby incorporated by reference herein in its entirety.

What is claimed is:

1. An information processing apparatus to communicate with an external apparatus, the information processing apparatus comprising:

a main control unit having a plurality of units configure to receive power and a first central processing unit configured to determine whether a session, required to be established to perform a specific type of communication between the information processing apparatus and the external apparatus, has been established;

a communication unit having a second central processing unit; and a power supply control unit configured to shift a power mode of the information processing apparatus that includes a normal power mode, where each unit in the main control unit and the communication unit receives power, a first power mode, and a second power mode where the communication unit receives power from the power supply control unit and the main control unit does not receive power from the power supply control unit, wherein, in response to determining that the required session has been established, the power supply control unit shifts the power mode from the normal power mode to the first power mode where the plurality of units configure to receive power do not receive power, and where the communication unit and the first central processing unit receive power from the power supply control unit, and the communication unit and the first central processing unit maintain the established required session between the information processing apparatus and the external apparatus while maintaining the first power mode, wherein, while the required session is established and in response to the first central processing unit determining in the first power mode that a packet received from the external apparatus is a session confirmation packet, the first central processing unit is configured to transmit a session response packet to the external apparatus while maintaining the first power mode, and wherein the session confirmation packet is a keep-alive communication received by the information processing apparatus and configured to allow the external apparatus to check that a link between the information processing apparatus and the external apparatus is operating, or to prevent the link from being broken.

2. The information processing apparatus according to claim 1, wherein a clock frequency of the first central processing unit is reduced while in the first power mode so that the power received by the first central processing unit is less than the power the first central processing unit receives while the clock frequency is not reduced in the first power mode.

3. The information processing apparatus according to claim 1, wherein, while the required session is established and in response to the first central processing unit determining in the first power mode that a packet received from the external apparatus is not a session confirmation packet, the first central processing unit is configured to transmit a response packet to the external apparatus while maintaining the first power mode in a case where it is determined that the received packet is a packet for which a response can be made while maintaining the information processing apparatus in the first power saving mode.

4. The information processing apparatus according to claim 1, wherein, while the required session is established and in response to the first central processing unit determining in the first power mode that a packet is not received from the external apparatus, the first central processing unit is configured to transmit a session confirmation packet to the external apparatus while maintaining the first power mode.

5. The information processing apparatus according to claim 1, wherein, in a case where it is determined that the required session has been disconnected or a session error has occurred and in response to the first central processing unit determining in the first power mode that no other required session has been established, the power supply control unit shifts the power mode from the first power mode, where the communication unit and the first central processing unit receive power, to the second power mode, where the communication unit receives power from the power supply control unit and the main control unit does not receive power from the power supply control unit.

6. The information processing apparatus according to claim 1, wherein the specific type of communication between the information processing apparatus and the external apparatus that requires the session to be established is one of an Internet protocol security (IPSec) communication or a transmission control protocol (TCP) communication.

7. The information processing apparatus according to claim 1, wherein, in response to determining that the required session has not been established, the power supply control unit shifts the power mode from the normal power mode to the second power mode,
wherein the second central processing unit is configured to determine in the second power mode whether a received packet matches a predetermined proxy response pattern, and
wherein, in response to the second central processing unit determining that a packet received from the external apparatus matches the predetermined proxy response pattern, the second central processing unit is configured to transmit a proxy response packet to the external apparatus while maintaining the second power mode.

8. The information processing apparatus according to claim 7, wherein the predetermined proxy response pattern is at least one of a pattern indicating an address resolution protocol (ARP) request or a simple network management protocol (SNMP) device information acquisition request.

9. The information processing apparatus according to claim 7, wherein the predetermined proxy response pattern is received from the main control unit as part of a process to shift to the second power mode and is stored in a memory of the communication unit.

10. The information processing apparatus according to claim 1,
wherein, in the normal power mode, the first central processing unit executes a first network module that is compatible with every type of communication that can be performed by the information processing apparatus, and
wherein, in the first power mode, the first central processing unit executes a second network module that is compatible with only a specific type of communication using the required session established between the information processing apparatus and the external apparatus.

11. The information processing apparatus according to claim 10, wherein information needed by the second network module for the specific type of communication is copied from the first network module.

12. The information processing apparatus according to claim 1, further comprising a printer configured to perform print processing.

13. A method for controlling an information processing apparatus to communicate with an external apparatus, wherein the information processing apparatus includes a main control unit having a plurality of units configure to receive power and a first central processing unit, a communication unit having a second central processing unit, and a power supply control unit configured to shift a power mode of the information processing apparatus that includes a normal power mode, where each unit in the main control unit and the communication unit receives power, a first power mode, and a second power mode where the communication unit receives power from the power supply control unit and the main control unit does not receive power from the power supply control unit, the method comprising:
determining, using the first central processing unit, whether a session, required to be established to perform a specific type of communication between the information processing apparatus and the external apparatus, has been established; and
in response to determining that the required session has been established,
shifting, using the power supply control unit, the power mode from the normal power mode to the first power mode where the plurality of units configure to receive power do not receive power, and where the communication unit and the first central processing unit receive power from the power supply control unit, and
maintaining, using the communication unit and the first central processing unit, the established required session between the information processing apparatus and the external apparatus while maintaining the first power mode,
wherein, while the required session is established and in response to the first central processing unit determining in the first power mode that a packet received from the external apparatus is a session confirmation packet, transmitting, using the first central processing unit, a session response packet to the external apparatus while maintaining the first power mode, and
wherein the session confirmation packet is a keep-alive communication received by the information processing apparatus and configured to allow the external apparatus to check that a link between the information processing apparatus and the external apparatus is operating, or to prevent the link from being broken.

14. A non-transitory computer-readable storage medium storing computer executable instructions to cause a computer to execute a method for controlling an information processing apparatus to communicate with an external apparatus, wherein the information processing apparatus includes a main control unit having a plurality of units configure to receive power and a first central processing unit, a communication unit having a second central processing unit, and a power supply control unit configured to shift a power mode of the information processing apparatus that includes a normal power mode, where each unit in the main control unit and the communication unit receives power, a first power mode, and a second power mode where the communication unit receives power from the power supply control unit and the main control unit does not receive power from the power supply control unit, the method comprising:
determining, using the first central processing unit, whether a session, required to be established to perform a specific type of communication between the information processing apparatus and the external apparatus, has been established; and
in response to determining that the required session has been established,
shifting, using the power supply control unit, the power mode from the normal power mode to the first power mode where the plurality of units configure to receive power do not receive power, and where the communication unit and the first central processing unit receive power from the power supply control unit, and
maintaining, using the communication unit and the first central processing unit, the established required session between the information processing apparatus and the external apparatus while maintaining the first power mode, wherein, while the required session is established and in response to the first central processing unit determining in the first power mode that a packet received from the external apparatus is a session confirmation packet, transmitting, using the first central processing unit, a session response packet to the external apparatus while maintaining the first power mode, and wherein the session confirmation packet is a keep-alive communication received by the information processing apparatus and configured to allow the external apparatus to check that a link between the information processing apparatus and the external apparatus is operating, or to prevent the link from being broken.

* * * * *